Figure 1:
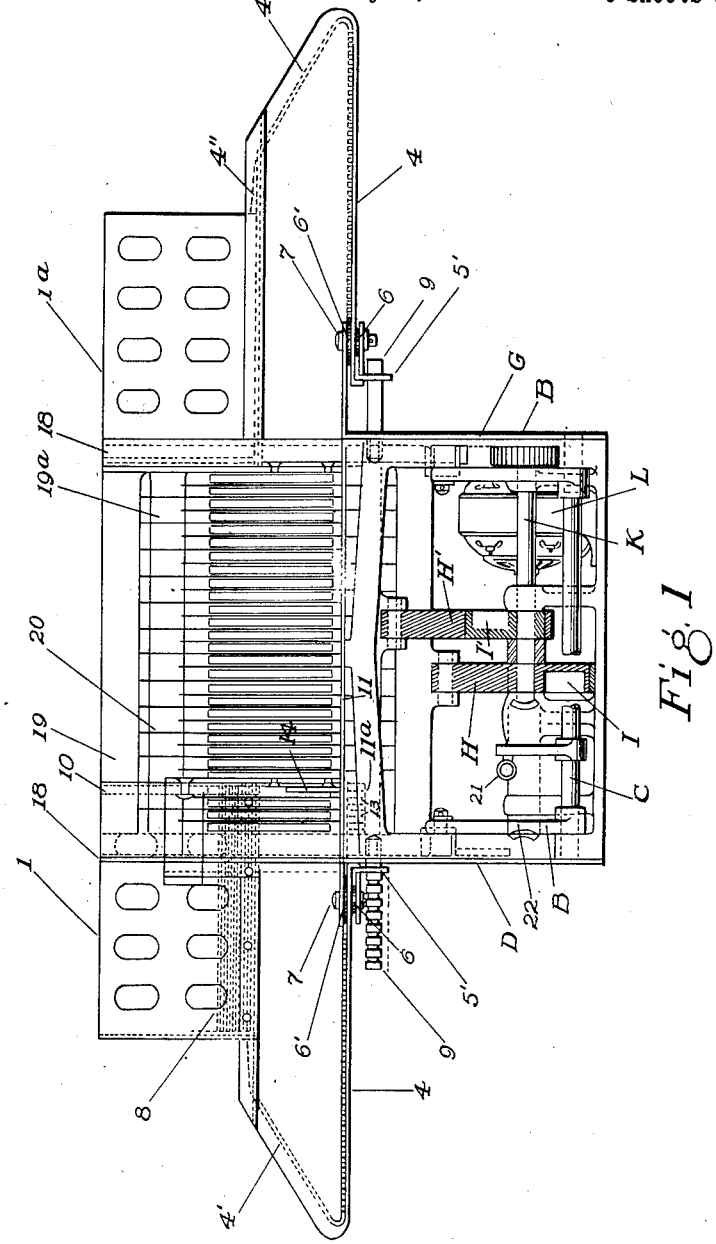

Aug. 28, 1928.

O. F. ROHWEDDER 1,682,581

BREAD FASTENING MACHINE

Filed July 10, 1926 4 Sheets-Sheet 1

Otto F. Rohwedder

INVENTOR.

Aug. 28, 1928.
O. F. ROHWEDDER
1,682,581
BREAD FASTENING MACHINE
Filed July 10, 1926      4 Sheets-Sheet 2
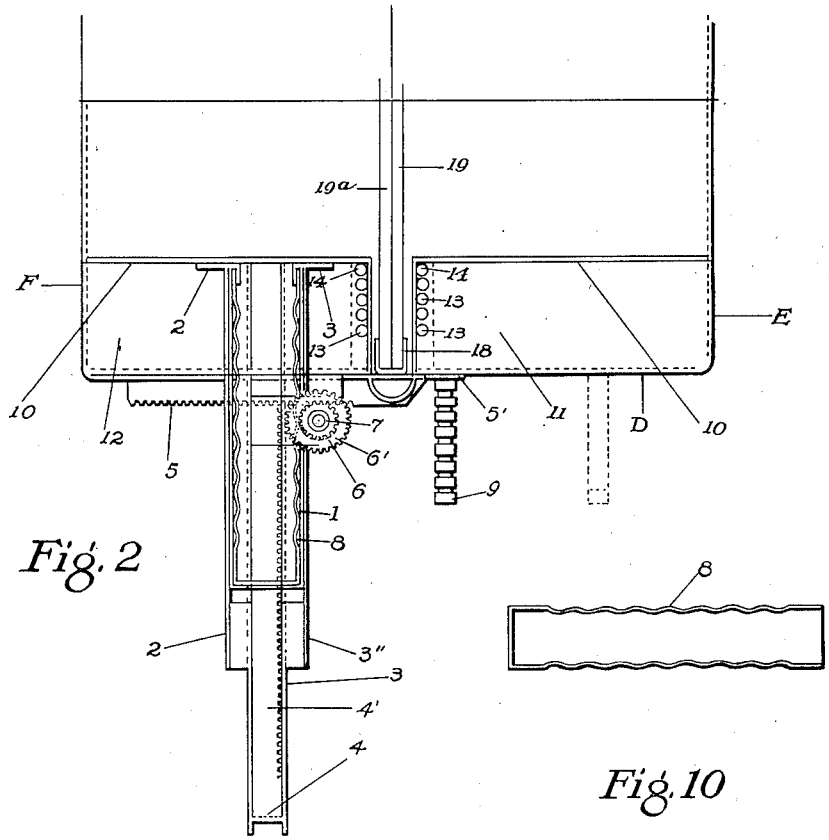
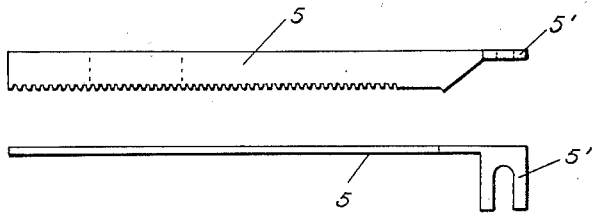
INVENTOR.

Aug. 28, 1928.  
O. F. ROHWEDDER  
1,682,581  
BREAD FASTENING MACHINE  
Filed July 10, 1926  
4 Sheets-Sheet 3
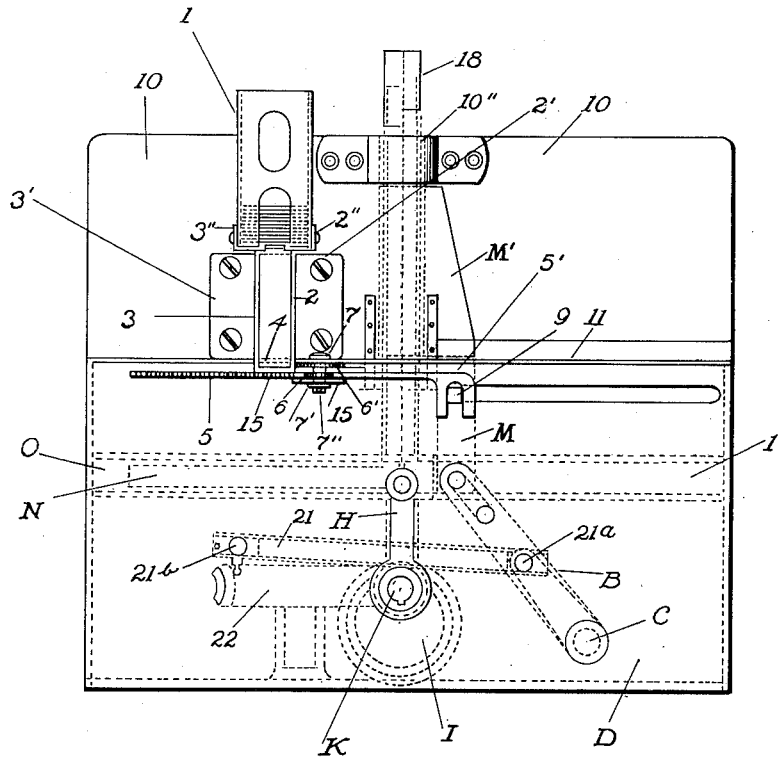
Fig. 3
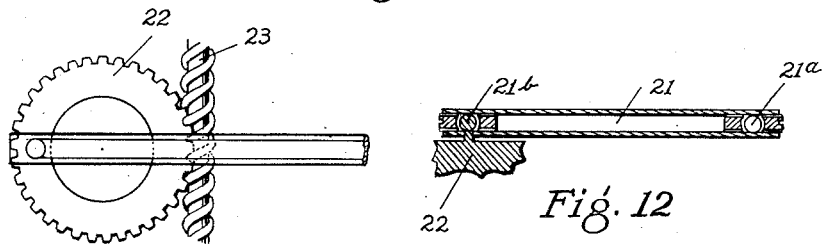
Fig. 11
Fig. 12
*INVENTOR.*

Aug. 28, 1928.
O. F. ROHWEDDER
1,682,581
BREAD FASTENING MACHINE
Filed July 10, 1926    4 Sheets-Sheet 4
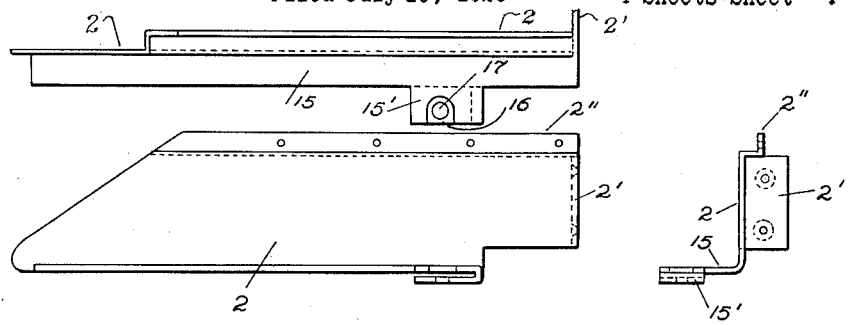
Fig. 4
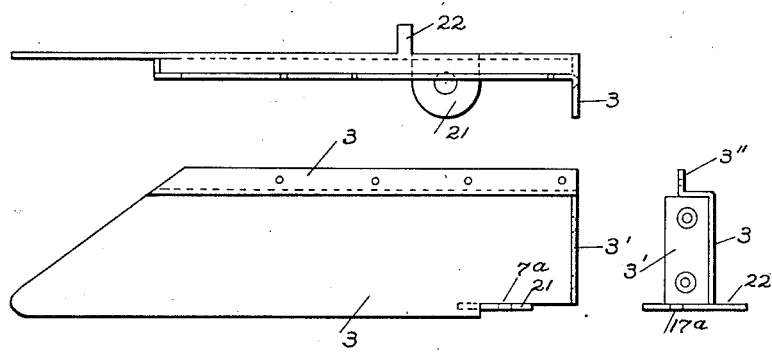
Fig. 5
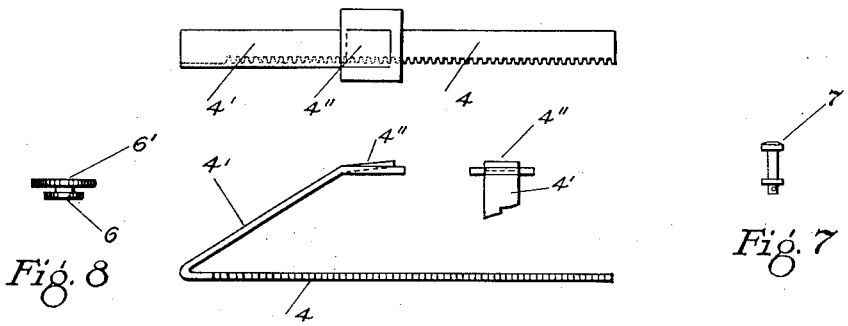
Fig. 6     Fig. 7
Fig. 8
INVENTOR.

Patented Aug. 28, 1928.

1,682,581

UNITED STATES PATENT OFFICE.

OTTO F. ROHWEDDER, OF DAVENPORT, IOWA.

BREAD-FASTENING MACHINE.

Application filed July 10, 1926. Serial No. 121,712.

My invention relates to a bread fastening machine intended to secure the slices of a loaf of bread together in their original position after being cut by a bread slicing machine.

The objects of my invention are:

1. To provide an appliance which can be built in combination with a bread slicing machine and which will secure together the slices of bread when cut, in the original form of the loaf and hold them in such position while the bread is being wrapped, and when unwrapped.

2. To provide means for holding the slices of bread together as a whole and also to hold at each end of the loaf and permit the slices at the middle portion of the loaf to be taken out so that the remaining portions of the loaf can then be placed in juxtaposition.

3. To provide means for preventing the drying out of a loaf of bread when cut by retaining one or both of the ends or crusts in their original position and avoiding the exposure of the cut surface of the loaf to the air.

I accomplish these objects by the means illustrated in the accompanying drawings, in which,—

Figure 1 is a side elevation of a bread slicing machine with my appliance attached thereto, with the side plate, E, omitted, and showing a portion of the knife driving mechanism in section for clearness of illustration; Fig. 2 is a top or plan view of the left portion of the machine shown in Figure 1; Fig. 3 is an end view showing the left end of the apparatus shown in Figure 1, with interior parts in dotted lines; Fig. 4 is an enlarged detail showing a side elevation, plan view and end view of the plate, 2; Fig. 5 is an enlarged detail showing a side elevation, plan view and end view of the plate 3; Fig. 6 is an enlarged detail showing a side elevation, and plan view of the pusher member 4, and an end view of the part, 4''; Fig. 7 is a detail view of the pin upon which the double pinions, 6 and 6', are mounted; Fig. 8 is a detail view showing side elevation of the double pinions, 6 and 6'; Fig. 9 is an enlarged detail showing plan view and side elevation of the rack, 5; Figure 10 is a detail view of the staples used to secure the slices of bread together after being cut. For clearness of illustration, Figures 2 to 10 inclusive are drawn on a scale approximately double that of Figure 1—Figure 1 being drawn as large as it could be to get the entire figure on one sheet. Figure 11 is a detail view showing the worm, 23, and worm gear, 22, and Figure 12 is a sectional detail of the connecting rod, 21, and the ball and socket joints connecting it to the crank pin, $21^b$, and one of the levers, B.

Similar characters refer to similar parts throughout the several views.

The bread cutting machine is composed of a platform, 11, upon which the loaves of bread are placed to be fed to the knives, 20, which are mounted in two frames, 19 and $19^a$ having an alternating, reciprocating vertical motion in guides, 18, and driven by links, H and H', driven in turn by cams, I and I', mounted upon a shaft K driven by a motor, L, through suitable reduction gears, or any desired power. The platform, 11, is composed of two flat boards, sheets of metal or other suitable support, mounted horizontally upon the frame, D, E, F and G, and separated far enough apart at their inner edges to allow the reciprocating knives, 20, to be mounted between them.

A pair of levers, B, are mounted upon a shaft, C, as shown in Figures 1 and 3. The upper ends of these levers are connected to legs, M, of a feeder, M', which operates to force the bread against the reciprocating knives when moved into its forward position shown in Figure 3. The legs, M, have united to them bars, N, which slide longitudinally in channels mounted at either end of the body of the bread cutter. The feeder, M', is moved forward and back by the levers, B, and these in turn are driven by a link, 21, having one end secured by a ball and socket joint, $21^a$, to one of the levers, B, and its opposite end secured by a ball and socket joint, $21^b$, to a worm gear, 22, mounted upon the base of the cutter and driven by a worm, 23, formed upon the shaft, K.

Racks, 5, are slidingly mounted at each end of the bread slicer and are formed of a horizontal plate with teeth on one edge and with a yoke 5', formed at one end. The yokes, 5', are adapted to engage bars, 9, which are secured to the legs of the feeder, M, and which actuate the racks, 5, in a reciprocating movement on a horizontal plane transversely of the cutting machine. The racks, 5, may be supported by the square bars, 9, or by any suitable support.

Double pinions, 6 and 6', are mounted upon pivots, 7, with the lower pinions, 6, meshing with the racks, 5.

Additional rack bars, 4, are slidingly mounted upon suitable supports formed integral with the side plates, 2 and 3, and have teeth upon one edge thereof which mesh with the larger or upper pinions, 6', and which operate to move the racks, 4, in a horizontal plane longitudinally of Figure 1 and at right angles to the rack, 3.

The outer end, 4', of each of the racks, 4, is bent upwardly at an acute angle to the body thereof and the extreme end of it is widened to secure it in place upon angular flanges, 2" and 3", extending outwardly from the upper ends of the plates, 2 and 3, respectively. These plates, 2 and 3, are bolted or riveted to the end plates, 10, and extend outwardly therefrom at right angles thereto as shown in Figure 1.

The end plates, 10, have pins, 14, secured to them at their lower edges which are adapted to enter a series of holes, 13, punched in the plate, 11, whereby the position of the end plates can be adjusted to fit various lengths of loaf of bread and correspondingly spaced recesses are cut in the bars, 9, to fit the yokes, 5', and allow adjustment thereof. In ordinary practice, it will be sufficient to have one of the end plates, 10, adjustable, although both may be so formed if desired. The middle portion of the plate, 10, is bent outwardly as shown in Figure 2 so as to permit it to encircle the ends of the frames holding the cutting knives, Figure 2 showing the plates, 10, in their shortest adjustment. Obviously the length of adjustment may be varied to suit varying requirements as desired.

Housings, 1 and 1ª, are mounted upon the flanges, 2" and 3", which serve as retainers to hold a supply of the wire staples, 8.

In the operation of my device, a loaf of bread is placed upon the support, 11. The machine is then set in operation and the bread is fed through the cutting knives. After the bread has passed through the knives and is supported upon the left portion of the support, 11, as shown in Figure 3, the feed levers, B, are thrown back toward the right as shown in Figure 3, thus driving the racks, 5, to the right and as the racks, 5, turn the double pinions, 6 and 6', the racks, 4, will be carried toward the center of the machine and the upper ends, 4", of the racks 4, will each engage one of the staples, 8, and force it toward the center of the loaf. These staples are intended to be substantially longer than one-half the length of the loaf so that they will pass each other for a distance of several inches when fully inserted in the loaf, thus holding the slices firmly together in their original position.

After the cut bread is secured together by the staples, 8, it may be further secured by wrapping each individual loaf either manually or by being fed into a wrapping machine as it leaves the cutter.

It is obvious that when the wrapping of the bread is removed, the staples will still hold the slices in their original position during ordinary movements. When the bread is unwrapped, the staples 8, can be entirely withdrawn so as to leave the cut slices free or if desired, the loaf of bread may be pulled apart at the middle and some of the middle slices taken out and the remainder of the loaf pressed together by hand so as to prevent the exposure of any of the cut slices to the air.

I do not limit my claims to the precise form of apparatus shown in the drawings as any form of apparatus may be used which will feed the staples into the loaf after it is cut into slices. Neither do I limit my invention to the precise form of staples shown, as it is obvious that other forms of metal, wood or fiber rods may be used to accomplish the same purpose, it being necessary, however, that they overlap at the middle portion of the loaf.

I claim:

1. A bread fastening machine comprising a supporting platform, means for retaining the cut slices of a loaf of bread in their uncut position thereon, and means for inserting into the loaf from opposite ends thereof a plurality of retaining rods which overlap at the middle of the loaf.

2. A bread fastening machine comprising a supporting platform, means for retaining the cut slices of a loaf of bread in their uncut position thereon, and means for inserting into the loaf from opposite ends thereof a plurality of wire staples which overlap at the middle of the loaf.

3. A bread fastening machine comprising a supporting platform with hoppers adjustably mounted thereon, wire staples housed in the hoppers, and means for automatically driving one of the staples into each end of the loaf until they overlap at the middle thereof.

4. A bread fastening machine comprising a supporting platform with hoppers mounted thereon, wire staples housed in the hoppers, and means for automatically driving one of the staples into each end of the loaf until they overlap at the middle thereof.

5. The combination with a bread slicing machine, of a platform to receive the bread after it passes through the knives, suitable housings mounted at the opposite ends of the platform, retainers secured in the housings, and means operable by the bread slicing machine for forcing a pair of retainers into each loaf of bread from opposite ends thereof until they overlap at the middle of the cut loaf.

6. The combination with a bread cutting machine, of a platform to receive and retain the bread after it passes through the cutting knives, pusher bars slidingly mounted at each end thereof, supports for the retainers mounted adjacent the pusher bars, heads formed upon the pusher bars adapted to engage a retainer seated in each retainer support and means operable by the cutting machine for driving the pusher bars inwardly to the ends of the loaf supported upon the platform.

7. In a machine for securing the slices of a loaf of bread in their original position after being cut, the combination with a pusher bar having a rack plate formed integral therewith, a pinion mounted adjacent the rack and meshing therewith, a second pinion formed integral with the first mentioned pin, a transverse rack mounted adjacent the second pinion and meshing therewith and means for driving the transverse rack with an alternate reciprocating movement.

In testimony whereof he affixes his signature.

OTTO F. ROHWEDDER.